(12) United States Patent
Kim et al.

(10) Patent No.: US 8,742,316 B2
(45) Date of Patent: Jun. 3, 2014

(54) PHOTO DETECTOR HAVING COUPLING CAPACITOR

(75) Inventors: Kisoo Kim, Daejeon (KR); Eun Soo Nam, Daejeon (KR); Jae-Sik Sim, Daejeon (KR); Yong-Hwan Kwon, Daejeon (KR); Bongki Mheen, Daejeon (KR); Myungsook Oh, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 600 days.

(21) Appl. No.: 12/942,338

(22) Filed: Nov. 9, 2010

(65) Prior Publication Data

US 2011/0133059 A1    Jun. 9, 2011

(30) Foreign Application Priority Data

Dec. 9, 2009    (KR) .................. 10-2009-0121915
Jul. 29, 2010    (KR) .................. 10-2010-0073374

(51) Int. Cl.
*G01J 1/44*    (2006.01)

(52) U.S. Cl.
USPC ............... 250/214.1; 250/214 R; 250/208.1; 330/308

(58) Field of Classification Search
USPC .......... 250/214.1, 214 R, 214 DC, 214 AG; 330/308
See application file for complete search history.

(56) References Cited

U.S. PATENT DOCUMENTS

| | | | |
|---|---|---|---|
| 5,532,474 A * | 7/1996 | Dautet et al. ............... | 250/214 R |
| 6,541,752 B2 | 4/2003 | Zappa et al. | |
| 7,518,095 B2 | 4/2009 | Forsyth | |
| 7,705,284 B2 * | 4/2010 | Inoue et al. ............... | 250/214 R |
| 2002/0032014 A1 * | 3/2002 | Gogolla et al. ............ | 455/196.1 |

FOREIGN PATENT DOCUMENTS

| | | |
|---|---|---|
| JP | 2008542706 A | 11/2008 |
| WO | WO-2007/102430 A1 | 9/2007 |

OTHER PUBLICATIONS

F. Lin, et al., "A photon-counting avalanche photodiode array with fully integrated active quenching and recharging circuit", Proc. of SPIE vol. 5826, pp. 569-579.

* cited by examiner

*Primary Examiner* — Tony Ko
(74) *Attorney, Agent, or Firm* — Rabin & Berdo, P.C.

(57) ABSTRACT

Provided is a photo detector. The photo detector includes: an avalanche photodiode; a bias circuit supplying a bias voltage to one end of the avalanche photodiode; a detection circuit connected to the other end of the avalanche photodiode and detecting a photoelectric current occurring in the avalanche photodiode; and a coupling capacitor connected to the one end or the other end of the avalanche photodiode and supplying a coupling voltage to drive the avalanche photodiode in a Geiger mode.

16 Claims, 10 Drawing Sheets

PHOTO DETECTOR HAVING COUPLING CAPACITOR

CROSS-REFERENCE TO RELATED APPLICATIONS

This U.S. non-provisional patent application claims priority under 35 U.S.C. §119 of Korean Patent Application Nos. 10-2009-0121915, filed on Dec. 9, 2009, and 10-2010-0073374, filed on Jul. 29, 2010, the entire contents of which are hereby incorporated by reference.

BACKGROUND OF THE INVENTION

The present invention disclosed herein relates to an electronic device, and more particularly, to a photo detector driving an avalanche photodiode in the Geiger mode.

Until recently, a variety of photo detection devices have been developed. Especially, a semiconductor photo detection device may be classified into a PN and PIN photo detector and an avalanche photo detector based on whether there is a gain or not. The PN and PIN photo detector detects light through a photoelectric current flowing in proportion to an intensity of the detected light. Moreover, the avalanche photo detector provides a gain through an avalanche process in order to increase the sensitivity about detected light.

However, there are limitations in obtaining a gain through the avalanche process. To resolve the above limitations, the avalanche photodiode is driven in the Geiger mode. That is, if a higher reverse bias than a breakdown voltage is applied to an avalanche photodiode (APD), a higher gain may be realized. Driving of the APD under this bias condition is the so-called Geiger mode. In the Geiger mode, it is possible to theoretically detect single photon.

In general, the APD provides a relatively low gain in a lower reverse bias state than a breakdown voltage $V_{BR}$. Instead of that, during the lower reverse bias state than a breakdown voltage, the APD provides a linear characteristic generating a photoelectric current in proportion to incident photon quantities. However, the APD in the Geiger mode does not generate a photoelectric current proportional to photon quantities any more. Instead of that, the APD provides a much greater gain than a gain of a linear characteristic region in the Geiger mode. Accordingly, a photo detection of a low light quantity is possible in the Geiger mode. Furthermore, since the Geiger mode provides a relatively greater photoelectric current than a linear mode, photo detection is possible without an additional complex low-noise amplifier.

Recently, many attempts for practical applications of the APD have been made. Especially, researches using the APD as a photo sensor to realize a three-dimensional image are being in progress. For example, if a photo detector using the APD is configured in an array, on detecting lights reflected after a single laser pulse is projected, information about an entire three-dimensional structure of an object may be obtained. This device is called a light detection ranging (LIDAR) system.

The number of photons returning to a detector array after being scattered from an object is reduced as their travelling distance is longer. As a result, its detected signal is weak. Thus, a photo detector array may operate in the Geiger mode in order to detect the weak signal. Moreover, technologies for configuring the photo detector array with an integrated circuit to form a two-dimensional focal plane and maximizing photo detection efficiency are required.

SUMMARY OF THE INVENTION

The present invention provides a method of uniformly matching switching characteristics with a Geiger mode or the quenching mode when avalanche photodiodes with an irregular breakdown voltage are configured in a cell array.

The present invention also provides a photo detector including a coupling capacitor in which the optimized Geiger or quenching mode is possible.

Embodiments of the present invention provide photo detectors including: an avalanche photodiode; a bias circuit supplying a bias voltage to one end of the avalanche photodiode; a detection circuit connected to the other end of the avalanche photodiode and detecting a photoelectric current occurring in the avalanche photodiode; and a coupling capacitor connected to the one end or the other end of the avalanche photodiode and supplying a coupling voltage to drive the avalanche photodiode in a Geiger mode.

In some embodiments, the bias voltage may be lower than a breakdown voltage of the avalanche photodiode.

In other embodiments, the coupling capacitor may have a fixed type and a size of the coupling voltage may vary according to a size of an overdrive voltage provided to the coupling capacitor.

In still other embodiments, the coupling capacitor may have a variable type and a size of the coupling voltage may vary according to a capacitance of the coupling capacitor.

In even other embodiments, the photo detectors may further include a capacitance control circuit to set the capacitance of the coupling capacitor.

In yet other embodiments, the capacitance control circuit may include a programmable memory device.

In further embodiments, the bias circuit may include: a voltage supply circuit generating a high voltage; a bias capacitor connected between an output node of the voltage supply circuit and a ground and stabilizing the high voltage; and a resistor connected to the output node of the voltage supply circuit and the one end of the avalanche photodiode.

In still further embodiments, when the coupling capacitor is connected to the one end of the avalanche photodiode, the photo detector may be driven in the Geiger mode at a high level interval of the coupling voltage.

In even further embodiments, when the coupling capacitor is connected to the other end of the avalanche photodiode, the photo detector may be driven in the Geiger mode at a low level interval of the coupling voltage.

In yet further embodiments, the coupling capacitor may include a first coupling capacitor connected to the one end of the avalanche photodiode and a second coupling capacitor connected to the other end of the avalanche photodiode.

In yet further embodiments, a differential voltage may be supplied to the first coupling capacitor and the second coupling capacitor.

In yet further embodiments, the avalanche photodiode or the coupling capacitor is fabricated into an integrated circuit.

In other embodiments of the present invention, photo detectors include: a plurality of photo detection cells, each having an avalanche photodiode and a coupling capacitor supplying a coupling voltage to one end or the other end of the avalanche photodiode; a bias circuit supplying a bias voltage to each one end of the plurality of photo detection cells; and a detection circuit connected to the other end of the avalanche photodiode of each of the plurality of photo detection cells and detecting a photoelectric current detected from the plurality of photo detection cells during a Geiger mode.

In some embodiments, a coupling capacitor of each of the plurality of photo detection cells may have a fixed type and at least two coupling voltages of respectively different levels may be supplied to the coupling capacitors during the Geiger mode.

In other embodiments, a coupling capacitor of each of the plurality of photo detection cells may have a variable type and a capacitance of each coupling capacitor of the plurality of photo detection cells may be set with one of at least two respectively different sizes.

In still other embodiments, an overdrive voltage of the same level to induce a coupling voltage may be supplied to each coupling capacitor of the plurality of photo detection cells.

In even other embodiments, the photo detector may further include a capacitance control circuit to set a capacitance of each coupling capacitor of the plurality of photo detection cells.

In yet other embodiments, the avalanche photodiode or the coupling capacitor in each of the plurality of photo detection cells may be integrally formed and the plurality of photo detection cells may be arranged in an array of a two-dimensional plane.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Figure 1:
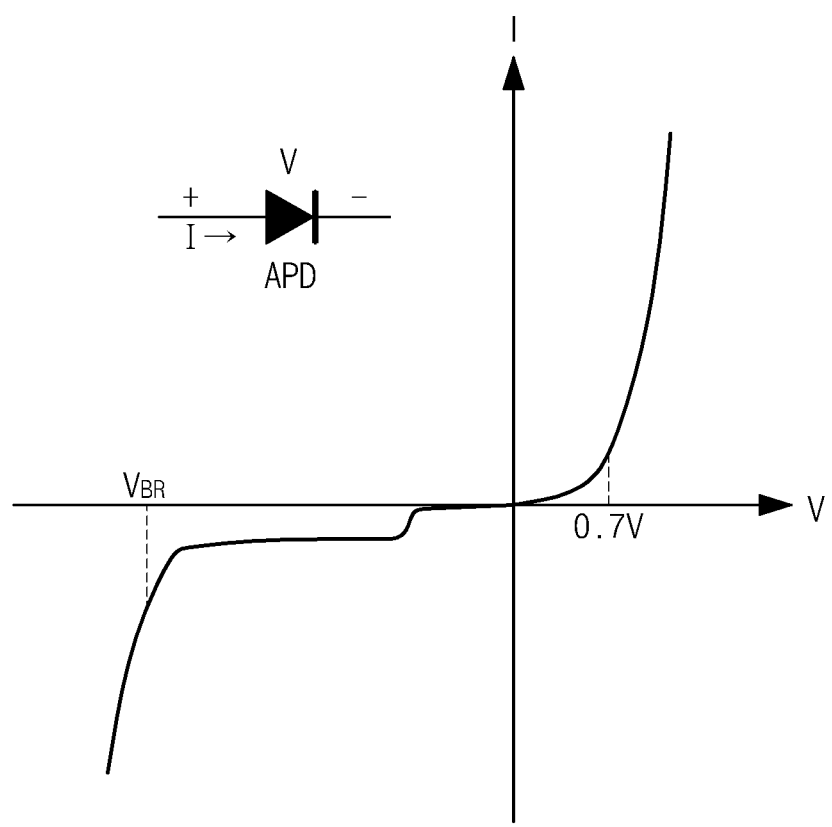
FIG. 1 is a graph illustrating characteristics of an avalanche photodiode (APD)

Preferred embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art. Like reference numerals refer to like elements throughout. Hereinafter, it will be described about an exemplary embodiment of the present invention in conjunction with the accompanying drawings.

FIG. 1 is a graph illustrating characteristics of an avalanche photodiode (APD). Referring to FIG. 1, a current-voltage (I-V) characteristic of the APD is shown.

During a forward bias, the APD is turned on at more than a threshold voltage (e.g., about 0.7 V). During a reverse bias, when a voltage applied from the external is more than a breakdown voltage $V_{BR}$, a high electric field is formed at a PN bonding surface of the APD. At this point, the avalanche effect occurs, in which an electron-hole pair is generated and then amplified to a current through a continuous ionization process. At this timing, a reverse current is drastically increased.

The Geiger mode of the APD means an optical detection operation, which is performed under a reverse bias condition of more than the breakdown voltage $V_{BR}$. The APD has a low gain and linear photon detection characteristic under a reverse bias condition of less than the breakdown voltage $V_{BR}$. That is, the APD generates a photoelectric current proportional to the number of incident photons. However, the APD loses the linear photo detection characteristic in the Geiger mode. In the Geiger mode for photo detection, the APD provides a relatively large gain instead of losing its linear characteristic.

In the Geiger mode, the APD detects a single photon and generates a photoelectric current (i.e., the Geiger current) theoretically. Accordingly, since a relatively large photoelectric current is generated in the Geiger mode, photons may be detected without an additional complex low-noise amplifier.

There are important factors to be considered to drive the APD in the Geiger mode. A first factor is related to how high a reverse bias voltage (higher than a breakdown voltage) is applied. A second factor is related to how long a reverse bias voltage higher than a breakdown voltage is applied. A third factor is related to how effectively the Geiger mode in a reverse bias state higher than a breakdown voltage exits.

The first and second factors are related to the height and duration of a pulse of an overdrive voltage (hereinafter, referred to as Vod) for maintaining the Geiger mode. The height and duration of the overdrive voltage Vod are determined by a dark count rate DCR and after pulsing of the APD. DCR means a frequency of an occurring photoelectric current by itself without an input of an optical signal from the external in the Geiger mode. The after pulsing is a phenomenon in which electrons and holes trapped in a previous Geiger mode are emitted and photoelectric current flows without an input of a photon, on entering the Geiger mode again after resetting.

The third factor is related to how fast the APD exits from the Geiger mode to a bias state of less than a breakdown voltage $V_{BR}$ after photon detection. Exiting the Geiger mode to a bias state of less than a breakdown voltage $V_{BR}$ is called quenching. The above-mentioned after pulsing may be minimized by adequately maintaining a bias voltage to be lower than a breakdown voltage through quenching.

Realizing of an overdrive voltage Vod and a quenching operation for the Geiger mode without difficulties is important in terms of a bias of the APD. According to an embodiment of the present invention, provided is a control means for proving an overdrive voltage Vod and quenching with optical conditions. Moreover, according to an embodiment of the present invention, a bias means of the APD used for constituting an integrated photo detector with no trouble will be described.

Figure 2:
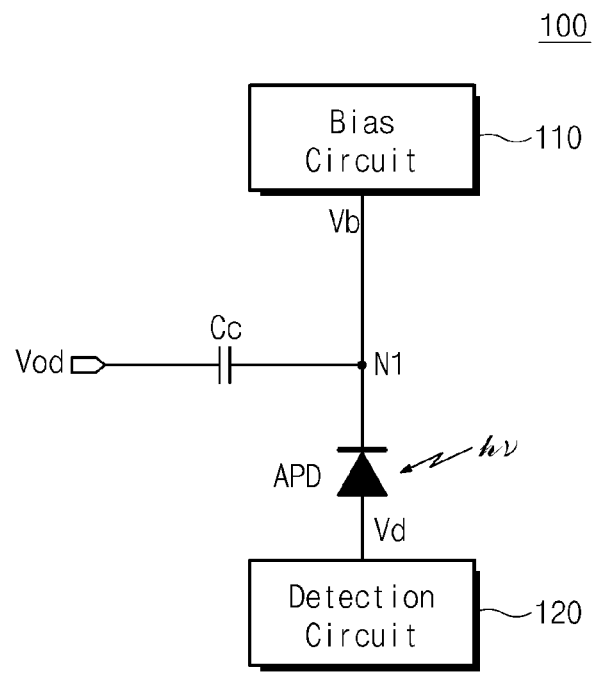
FIG. 2 is a block diagram of a photo detector according to a first embodiment of the present invention.

FIG. 2 is a block diagram of a photo detector according to a first embodiment of the present invention. Referring to FIG. 2, the photo detector 100 includes an APD, a bias circuit 110, and a detection circuit 120. The photo detector 100 includes an integrated coupling capacitor Cc for finely adjusting an overdrive voltage Vod.

The bias circuit 110 provides a DC bias voltage Vb to a cathode of the APD. The bias circuit 110 may provide a generated high voltage as a constant voltage to the cathode of the APD. According to an anode voltage Vd of the APD provided from the detection circuit 120, the bias circuit 110 may provide DC bias voltages Vb of various levels. If the anode voltage Vd is about 0 V, the bias circuit 110 may generate a DC bias voltage Vb of a relatively high voltage (e.g., about 40 V to about 50 V).

Although not illustrated in the drawings, a cathode voltage $V_{N1}$ of the APD may change due to a coupling capacitor Cc. For this, the bias circuit 110 may further include passive devices. For example, the bias circuit 110 may further include a bias resistor Rb and a bias capacitor Cb for stabilizing an output voltage of a voltage supply circuit (not shown) even if a cathode voltage $V_{N1}$ of the APDs changes. The bias resistor Rb may be connected to an output terminal of the voltage supply circuit and cathodes N1 of the APDs. Moreover, the bias capacitor Cb may be connected between an output terminal and a ground of the voltage supply circuit. Here, the voltage supply circuit, the bias capacitor Cb, and the bias resistor Rb may be collectively designated as a bias circuit.

One end of the coupling capacitor Cc is connected to the cathode of the APD. An overdrive voltage Vod to be applied to the cathode of the APD is provided to the other end of the coupling capacitor Cc. The bias voltage Vb provided from the bias circuit 110 is lower than a breakdown voltage $V_{BR}$ of the APD. However, once a relatively-low overdrive voltage is provided with a pulse, a cathode voltage $V_{N1}$ of the APD rises due to a capacitive coupling effect. The cathode voltage $V_{N1}$ raised by the capacitive coupling effect becomes higher than a breakdown voltage $V_{BR}$ of the APD. Then, at this moment, the APD enters into the Geiger mode.

Here, even if the APD is formed with various parameters through the same process, it does not match with the optimized Geiger mode condition. Accordingly, a size or a width of the overdrive voltage for the optimized Geiger mode drive may vary. However, if an overdrive voltage Vod is provided in consideration of the above characteristic change, the optimized Geiger mode drive may be possible.

The detection circuit 120 detects a photoelectric current occurring when the APD is driven in the Geiger mode. According to whether a photoelectric current is detected or not, the detection circuit 120 detects whether there are photons or not. The detection circuit 120 may further include filter components for removing noise besides a photoelectric current caused by a photon. In order for the above operations, the detection circuit 120 may provide an anode voltage Vd of the APD.

According to the anode voltage Vd provided from the detection circuit 120 and the cathode voltage $V_{N1}$ of the APD, the APD may driven in the Geiger or quenching mode. According to a DC bias voltage Vb provided from the bias circuit 110, the detection circuit 120 may provide an anode voltage Vd of the APD. For example, if the DC bias voltage Vb is a high voltage (e.g., about 40 V to about 50 V), the detection circuit 120 may provide an anode voltage Vd of about 0 V. On the contrary, if the DC bias voltage Vb is a low voltage, the detection circuit 120 may provide an anode voltage Vd of a negative voltage to maintain the Geiger or quenching mode.

Conditions for driving the APD into the Geiger or quenching mode may be controlled by the detection circuit 120. Or, the detection circuit 120 may provide an overdrive voltage Vod. According to a control of the detection circuit 120, the APD may be biased to the Geiger or quenching mode. Then, the detection circuit 120 may detect a sensed photoelectric current.

The photo detector 100 described with reference to FIG. 2 may drive the APD in the Geiger mode using a coupling effect. That is, only with the overdrive voltage Vod of a low voltage, the photo detector 100 may enter into the Geiger mode However, switching of the photo detector 100 of the present invention into the Geiger or quenching mode may be controlled by a DC bias voltage Vb and an anode voltage Vd besides the overdrive voltage Vod. That is, the photo detector 100 may be driven in the Geiger or quenching mode by the bias circuit 110 and the detection circuit 120, and the overdrive voltage Vod may be used as an adjust signal for varying characteristics of the photo detector 100.

Furthermore, the above-mentioned photo detector 100 of FIG. 2 is configured to provide an overdrive voltage Vod to a cathode of the APD. However, the present invention is not limited thereto. That is, the photo detector 100 may be configured to provide an overdrive voltage Vod to an anode of the APD. However, in this case, the APD may be driven in the Geiger mode at a low interval (or, a falling edge) of a pulse of an overdrive voltage Vod.

Figure 3:
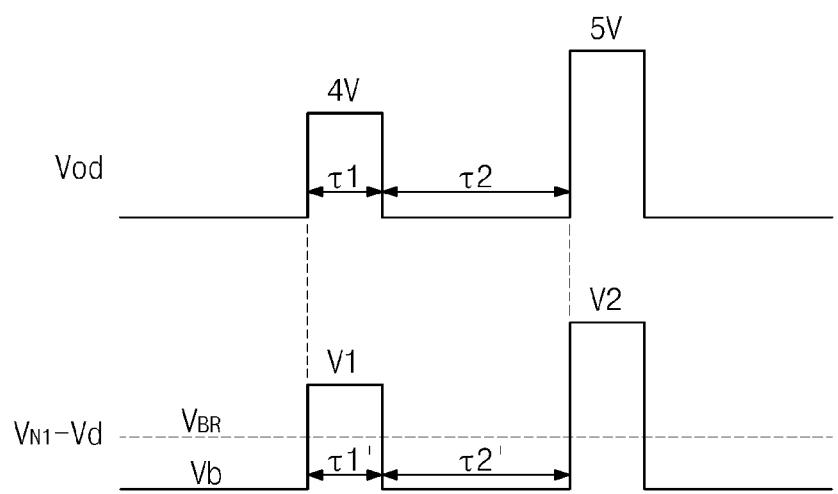
FIG. 3 is a waveform diagram to illustrate an operation of the photo detector of FIG. 2.

FIG. 3 is a waveform diagram to illustrate an operation of the photo detector of FIG. 2. Referring to FIG. 3, it illustrates changes of an overdrive voltage Vod and a both ends voltage ($V_{N1}$-Vd) of the APD according thereto.

According to the above-mentioned bias condition, the bias circuit 110 provides a bias voltage Vb to a cathode of the APD in order for Geiger mode drive. Moreover, the detection circuit 120 provides a voltage Vd to an anode of the APD. Then, the both ends of the APD are biased to the both ends voltage ($V_{N1}$-Vd).

The both ends voltage ($V_{N1}$-Vd) is lower than a breakdown voltage $V_{BR}$. In this state, the APD is not driven in the Geiger mode. However, once a pulse of an overdrive voltage Vod is provided to one end of a coupling capacitor Cc, a cathode voltage of the APD rises due to a coupling effect. A voltage of a cathode (i.e., a node N1) of the APD may be expressed as the following Equation 1.

$$V_{N1}=V_b+\alpha Vod \quad \text{[Equation 1]}$$

(where α is a coupling coefficient of a coupling capacitor Cc)

Here, for convenience of description, it is assumed that a breakdown voltage $V_{BR}$ of the APD is about 43 V, a coupling coefficient of the coupling capacitor Cc is 1, and the bias voltage Vb is about 40 V. In order to drive the APD in the Geiger mode, a voltage $V_{N1}$ of the node N1 needs to exceed about 43 V. Accordingly, if an overdrive voltage Vod is provided with a pulse of a 4 V size, a voltage $V_{N1}$ of the node N1 boosts more than at least about 44 V due to a coupling effect.

Referring to the timing diagram again, once an overdrive voltage Vod of about 4 V having a pulse width of τ1 is provided, the both ends voltage ($V_{N1}$-Vd) of the APD boosts to a higher voltage V1 than the breakdown voltage $V_{BR}$. Then, the boosted both ends voltage ($V_{N1}$-Vd) of the APD is maintained during a pulse interval τ1'. The pulse interval τ1' is proportional to the pulse interval τ1 of an overdrive voltage Vod provided as a low voltage.

Moreover, in order to switching from the Geiger mode into the quenching mode, an overdrive voltage Vod of about 0 V is provided. Then, the both ends voltage ($V_{N1}$-Vd) of the APD drops to a level of a bias voltage Vb due to a coupling effect, and is maintained in the quenching mode. The length of a pulse interval τ2', in which the both ends voltage ($V_{N1}$-Vd) of the APD is maintained in the quenching mode, depends on a pulse interval τ2 in which an overdrive voltage Vod of about 0 V is provided Additionally, the both ends voltage ($V_{N1}$-Vd) of the APD may have various sizes according to a level of the overdrive voltage Vod. As shown in the drawings, once an overdrive voltage Vod is provided with a pulse of a 5 V size, the both ends voltage ($V_{N1}$-Vd) of the APD boosts to a greater size V2 than a previous Geiger mode drive voltage V1. This means that the Geiger mode drive voltage may be easily controlled using an overdrive voltage Vod of a low voltage.

Actually, an operating voltage for driving the APD in the optimized Geiger mode may be variable. That is, according to a characteristic change of the APD, the optimized Geiger mode drive voltage may not be uniform. If photo detectors including the APDs are configured in a two-dimensional array, each cell may need to be controlled by respectively different Geiger mode drive voltages if necessary.

Here, according to an embodiment of the present invention, the APD may be biased by raising or dropping only an overdrive voltage Vod. In this case, all cells of the photo detector are driven in the Geiger mode such that photo detection efficiency may be drastically improved.

Figure 4:
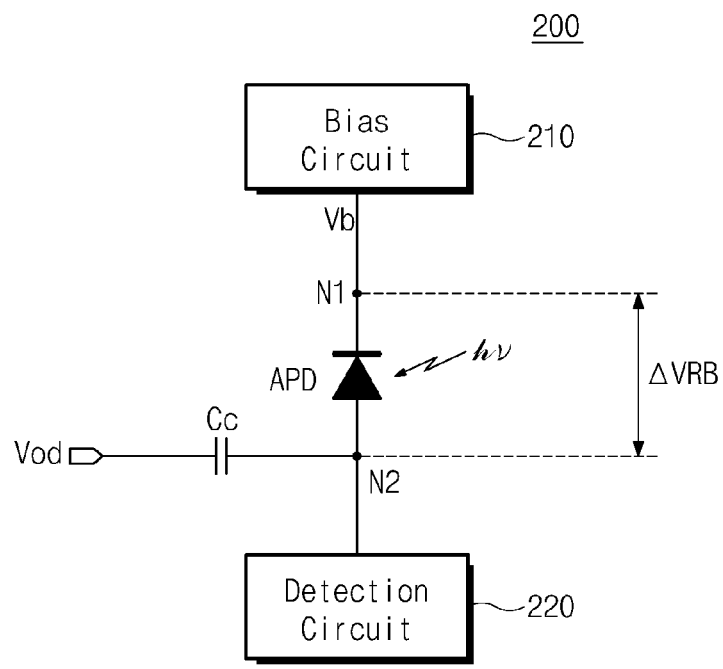
FIG. 4 is a block diagram illustrating a modification of the photo detector according to the first embodiment shown in FIG. 2.

FIG. 4 is a block diagram illustrating a modification of the photo detector according to the first embodiment shown in FIG. 2. Referring to FIG. 4, the photo detector 200 includes an APD, a bias circuit 210, and a detection circuit 220. The photo detector 200 further includes an integrated coupling capacitor Cc for applying an overdrive voltage Vod.

The bias circuit 210 provides a lower DC bias voltage than a breakdown voltage $V_{BR}$ to a cathode of the APD. The bias circuit 210 may generate a relatively high voltage (e.g., about 40 V to about 50 V). The bias circuit 210 may provide the generated high voltage to a cathode of the APD as a constant voltage. Although not illustrated in the drawings, the bias circuit 210 may further include passive devices such as a resistor and a capacitor in order to stably provide the generated high voltage to a cathode of the APD.

Unlike the configuration of FIG. 2, one end of the coupling capacitor Cc is connected to an anode of the APD. An overdrive voltage Vod to be applied to an anode of the APD is provided to the other end of the coupling capacitor Cc. A bias voltage Vb provided from the bias circuit 210 is lower than a breakdown voltage $V_{BR}$ of the APD. However, if an overdrive voltage Vod of a relatively low voltage is provided as a negative pulse, an anode voltage $V_{N2}$ of the APD drops due to a coupling effect. If the anode voltage $V_{N2}$ drops due to capacitive coupling effect, a reverse bias voltage ΔVRB applied to the both ends of the APD exceeds the breakdown voltage $V_{BR}$. Then, at this moment, the APD enters into the Geiger mode.

Here, even if the APD is formed with various parameters through the same process, it does not match with the optimized Geiger mode condition. Accordingly, a size or a width of the overdrive voltage for the optimized Geiger mode drive may vary. However, if an overdrive voltage Vod is provided in consideration of the above characteristic change, the optimized Geiger mode drive is possible.

The detection circuit 220 detects a photoelectric current occurring when the APD is driven in the Geiger mode. According to whether a photoelectric current is detected or not, the detection circuit 220 detects whether there are photons or not. The detection circuit 220 may further include filter components for removing noise besides a photoelectric current caused by a photon.

Figure 5:
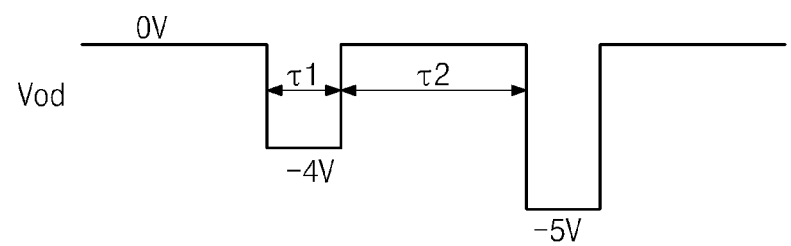
FIG. 5 is a waveform diagram to illustrate an operation of the photo detector of FIG. 4.
Figure 5:
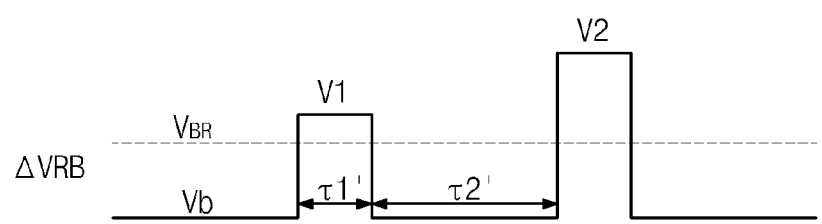

FIG. 5 is a waveform diagram to illustrate an operation of the photo detector of FIG. 4. Referring to FIG. 5, it illustrates changes of an overdrive voltage Vod and a reverse bias voltage ΔVRB applied to the both ends of the APD according thereto.

According to the above-mentioned bias condition, the bias circuit 210 provides a bias voltage Vb to a cathode of the APD in order for Geiger mode drive. The bias voltage Vb is lower than the breakdown voltage $V_{BR}$. In this condition, the APD is not driven in the Geiger mode. However, when a pulse of an overdrive voltage Vod is provided to one end of the coupling capacitor Cc, a voltage of an anode (i.e., a node N2) of the APD changes due to a coupling effect.

Here, for convenience of description, it is assumed that a breakdown voltage $V_{BR}$ of the APD is about 43 V, a coupling coefficient of the coupling capacitor Cc is 1, and the bias voltage Vb is about 40 V. In order to drive the APD in the Geiger mode, the reverse bias voltage ΔVRB needs to exceed about 43 V. Accordingly, if an overdrive voltage Vod is provides as a pulse of a −4 V size (i.e., a negative pulse), the reverse bias voltage ΔVRB boosts more than at least about 44 V due to a coupling effect.

Referring to the timing diagram again, once an overdrive voltage Vod of about −4 V having a pulse width of τ1 is provided, the reverse bias voltage ΔVRB of the APD boosts to a higher voltage V1 than the breakdown voltage $V_{BR}$. If a coupling coefficient is 1, the reverse bias voltage ΔVRB of the APD boosts to about 44V. Then, the reverse bias voltage ΔVRB of the APD is maintained during a pulse interval τ1'. The pulse interval τ1' is proportional to the pulse interval τ1 of an overdrive voltage Vod provided as a low voltage.

Moreover, in order to switch from the Geiger mode into the quenching mode, an overdrive voltage Vod of about 0 V is provided. Then, the reverse bias voltage ΔVRB of the APD restores to a size of a bias voltage Vb due to a coupling effect, and is maintained in the quenching mode. The length of a pulse interval τ2', in which the reverse bias voltage ΔVRB of the APD is maintained in the quenching mode, depends on a pulse interval τ2 in which an overdrive voltage Vod of about 0 V is provided.

Additionally, the reverse bias voltage ΔVRB of the APD may have various sizes according to a level of the overdrive voltage Vod. As shown in the drawings, once an overdrive voltage Vod is provided with a pulse of a −5 V size, the reverse bias voltage ΔVRB of the APD boosts to a greater size V2 than a previous Geiger mode drive voltage V1. This means that the Geiger mode drive voltage may be easily controlled using an overdrive voltage Vod of a low voltage.

Actually, an operating voltage for driving the APD in the optimized Geiger mode may be variable. That is, according to a characteristic change of the APD, the optimized Geiger mode drive voltage may not be uniform. If photo detectors including the APDs are configured in a two-dimensional array, each cell may need to be controlled by respectively different Geiger mode drive voltages if necessary.

Here, according to an embodiment of the present invention, the APD may be biased by raising or dropping only an overdrive voltage Vod. In this case, all cells of the photo detector are driven in the Geiger mode such that photo detection efficiency may be drastically improved.

Referring to FIGS. 2 through 5, various configurations and operations of the photo detector according to the first embodiment of the present invention were described. According to a position of a coupling capacitor Cc connected to the APD, a pulse of an applied overdrive voltage Vod is changed. However, the present invention provides a modification in which two coupling capacitors are connected to the both ends of the APD and an overdrive voltage Vod is provided as a differential voltage. That is, a first coupling capacitor Cc1 is connected to a cathode of the APD and a second coupling capacitor Cc2 is connected to an anode. Then, when a differential voltage is applied to the first and second coupling capacitors Cc1 and Cc2, the APD may be driven in the Geiger or quenching mode.

Figure 6A:
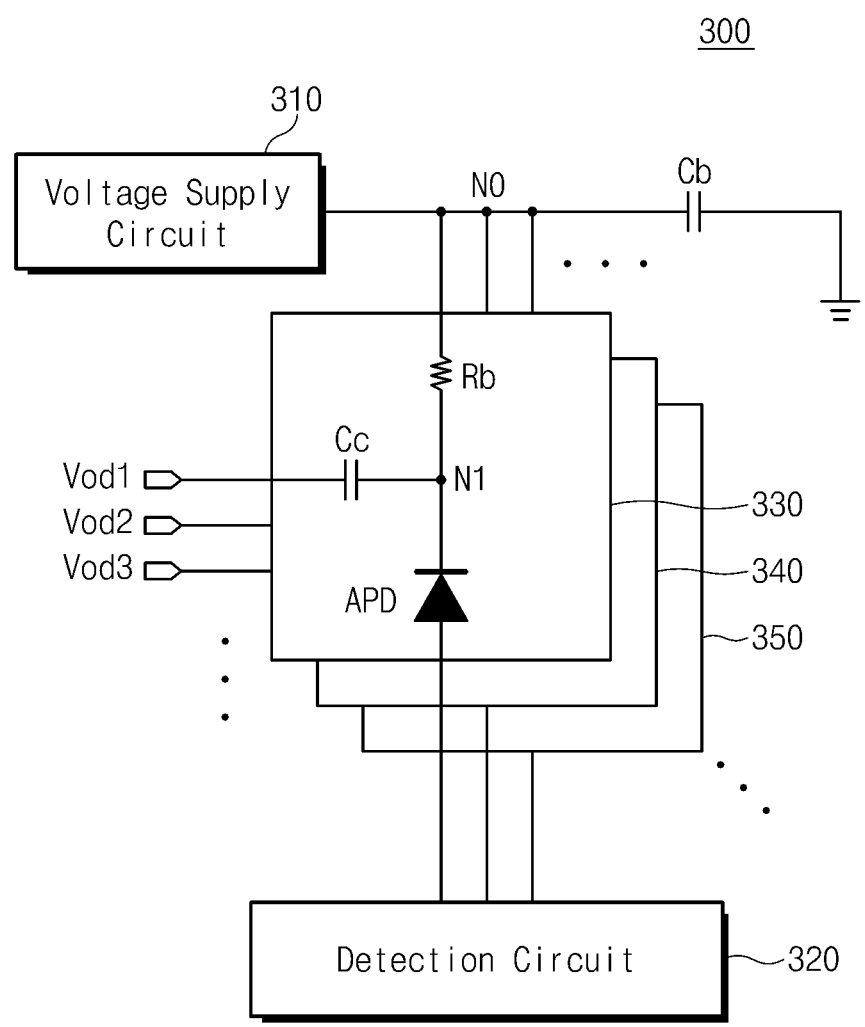
FIG. 6A is a block diagram illustrating an array of the photo detector of FIG. 2 according to another embodiment of the present invention.

FIG. 6A is a block diagram illustrating an array of the photo detector of FIG. 2 according to another embodiment of the present invention. Referring to FIG. 6A, the photo detector 300 includes photo detection cells 330, 340, and 350, each having an APD, a bias resistor Rb, and a coupling capacitor Cc. The photo detector 300 includes a voltage supply circuit 310 and a bias capacitor Cb. The photo detector 300 includes a detection circuit 320 for detecting a photoelectric current generated by each of the photo detection cells 330, 340, and 350.

Here, the voltage supply circuit 310 generates a high voltage to provide it to each of the photo detection cells 330, 340, and 350. The generated high voltage is provided to the APD through the bias resistor Rb. Then, the bias capacitor Cb is a stabilization capacitor for stably providing a voltage that the voltage supply circuit provides to the APDs. That is, according to a change of the overdrive voltage Vod, cathode voltages $V_{N1}$ of the APDs may change. Even if the cathode voltages $V_{N1}$ of the APDs change, an output voltage $V_{NO}$ of the voltage supply circuit 310 is stabilized by the bias capacitor Cb. Here, the voltage supply circuit 310, the bias capacitor Cb, and the bias resistor Rb may constitute a bias circuit.

The detection circuit 320 detects a photoelectric current that each of the photo detection cells 330, 340, and 350. Each of the photo detection cells 330, 340, and 350 may be driven in the Geiger mode. The detection circuit 320 determines whether there are photons or not using a photoelectric current that each of the photo detection cells 330, 340, and 350 detects. Additionally, the detection circuit 320 may provide overdrive voltages Vod1, Vod2, and Vod3.

Each of the photo detection cells 330, 340, and 350 includes an APD, a bias resistor Rb, and a coupling capacitor Cc. Overdrive voltages Vod1, Vod2, and Vod3 for boosting a cathode voltage $V_{N1}$ of the APD may be provided to a coupling capacitor Cc of each of the photo detection cells 330, 340, and 350. Through this configuration, even if the APD of each of the photo detection cells 330, 340, and 350 has different characteristics, the optimized Geiger mode drive voltage may be provided.

Figure 6B:
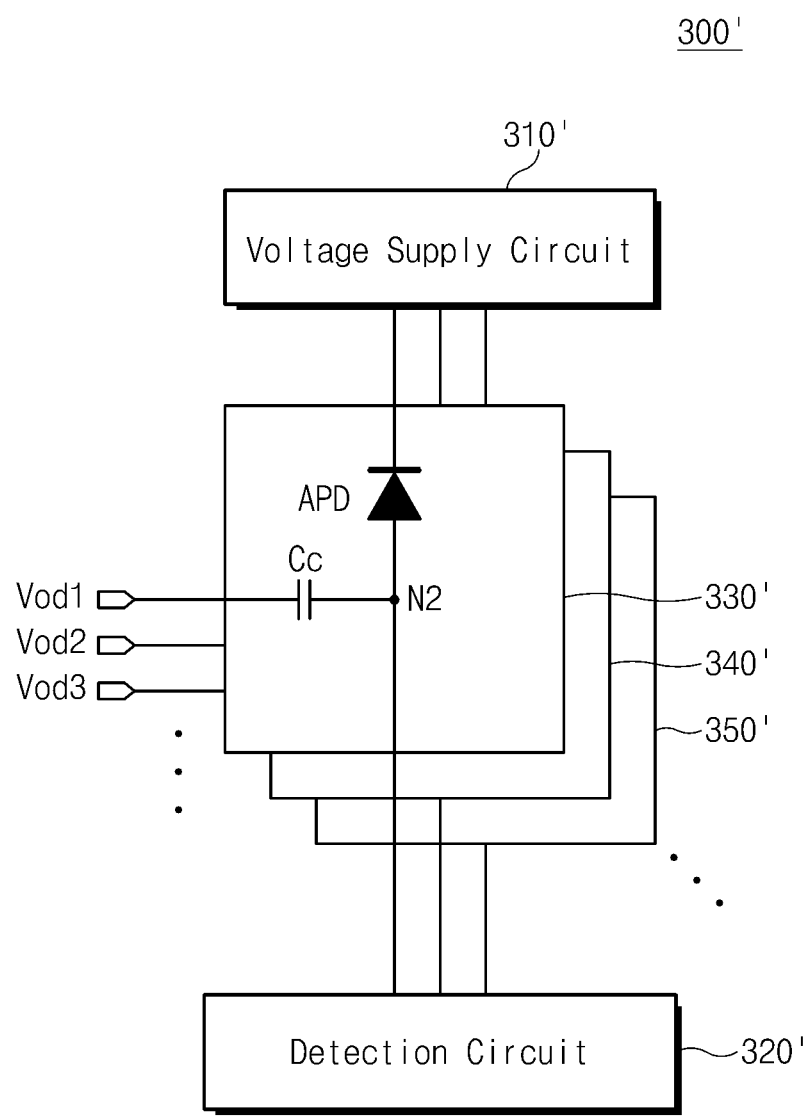
FIG. 6B is a block diagram illustrating an array of the photo detector of FIG. 4 according to an embodiment of the present invention.

FIG. 6B is a block diagram illustrating an array of the photo detector of FIG. 4 according to an embodiment of the present invention. Referring to FIG. 6B, the photo detector 300' includes photo detection cells 330', 340', and 350', each having an APD and a coupling capacitor Cc. The photo detector 300' includes a voltage supply circuit 310' and a detection circuit 320' for detecting a photoelectric current generated by each of the photo detection cells 330', 340', and 350'.

Here, the voltage supply circuit 310' generates a high voltage to provide it to each of the photo detection cells 330', 340', and 350'. According to a change of an overdrive voltage Vod, anode voltages $V_{N2}$ of the APDs may vary.

The detection circuit 320' detects a photoelectric current that each of the photo detection cells 330', 340', and 350'. Each of the photo detection cells 330', 340', and 350' may be driven in the Geiger mode. The detection circuit 320' determines whether there are photons or not using a photoelectric current that each of the photo detection cells 330', 340', and 350' detects. Additionally, the detection circuit 320' may provide overdrive voltages Vod1, Vod2, and Vod3.

Each of the photo detection cells 330', 340', and 350' includes an APD and a coupling capacitor Cc. Overdrive voltages Vod1, Vod2, and Vod3 for boosting an cathode voltage $V_{N2}$ of the APD may be provided to a coupling capacitor Cc of each of the photo detection cells 330', 340', and 350'. Through this configuration, even if the APD of each of the photo detection cells 330', 340', and 350' has different characteristics, the optimized Geiger mode drive voltage may be provided.

Unlike the photo detector 300 of FIG. 6A, in the photo detector 300' of FIG. 6B, each of the photo detection cells 330', 340', and 350' does not need to include a bias resistor Rb or a bias capacitor Cb. Accordingly, a size of each of the photo detection cells 330', 340', and 350' may be further reduced compared to the embodiment of FIG. 6A.

Figure 7:
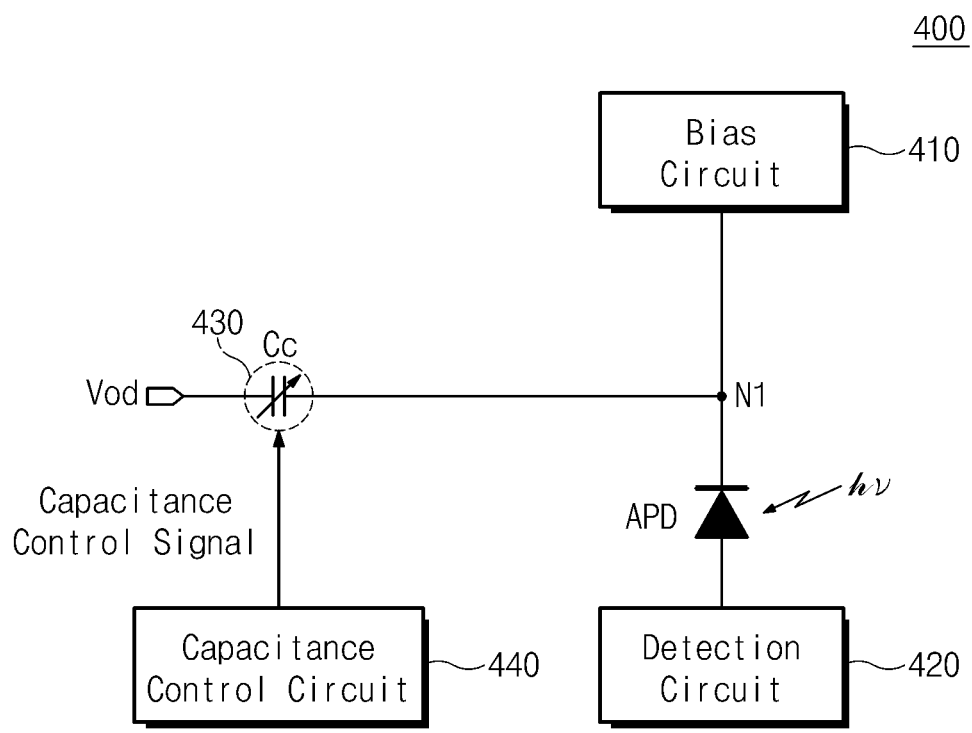
FIG. 7 is a block diagram of a photo detector according to a second embodiment of the present invention.

FIG. 7 is a block diagram of a photo detector according to a second embodiment of the present invention. Referring to FIG. 7, the photo detector 400 includes an APD, a bias circuit 410, and a detection circuit 420. The photo detector 400 further includes a coupling capacitor Cc 430 for varying a capacitance and a capacitance control circuit 440 for controlling a capacitance of the coupling capacitor 430.

The bias circuit 410 may generate a relatively high voltage (e.g., about 40 V to about 50 V). The bias circuit 410 may provide the generated high voltage to a cathode of the APD as a constant voltage. Although not illustrated in the drawings, the bias circuit 410 may further include passive devices such as a resistor and a capacitor in order to stably provide the generated high voltage to a cathode of the APD.

The bias circuit 410 provides a lower bias voltage Vb than a breakdown voltage $V_{BR}$ to a cathode of an APD. The bias circuit 410 may generate a relatively high voltage (e.g., about 40 V to about 50 V). The bias circuit 410 may provide the generated high voltage to a cathode of the APD as a constant voltage. Although not illustrated in the drawings, the bias circuit 410 may further include passive devices such as a resistor and a capacitor in order to stably provide the generated high voltage to a cathode of the APD.

One end of the coupling capacitor Cc is connected to a cathode of the APD. An overdrive voltage Vod to be applied to the cathode of the APD is provided to the other end of the coupling capacitor Cc. Here, a pulse size of the overdrive voltage Vod may be fixed unlike the first embodiment. Instead of that, according to a size change of a capacitance of the coupling capacitor Cc, the Geiger mode drive voltage formed in the cathode of the APD may be adjusted in various levels. The coupling capacitor Cc of a capacitance variable type may have an integrated circuit form. Moreover, the coupling capacitor Cc may have capacitances of various sizes through switches.

The capacitance control circuit 440 adjusts a capacitance of the capacitance variable type coupling capacitor Cc 430. The capacitance control circuit 440 generates a capacitance control signal to set a capacitance of the coupling capacitor Cc 430. The capacitance control circuit 440 generates a capacitance control signal according to characteristics of the APD. Then, the capacitance control signal for driving the coupling capacitor Cc 430 in the Geiger mode is provided to the coupling capacitor Cc 430. The applied overdrive voltage Vod in this state boosts a cathode voltage $V_{N1}$ of the APD to a coupling voltage corresponding to a set capacitance.

The capacitance control circuit 440 may have various forms. For example, the capacitance control circuit 440 may include a fuse option for providing a capacitance control signal as a binary data or a programmable nonvolatile memory device such as an erasable programmable read only memory (EPROM). Or, the capacitance control circuit 440 may include volatile memory devices such as a register to store and provide binary data patched from a nonvolatile memory device.

The detection circuit 420 detects a photoelectric current occurring at the time of when the APD is driven in the Geiger mode. According to whether to detect a photoelectric current, the detection circuit 420 may detect whether are photons or not.

The photo detector 400 for providing the optimized Geiger mode drive voltage by fixing a level of an overdrive voltage Vod and controlling a capacitance of the coupling capacitor was described with reference to FIG. 7. According to its configuration, the optimized Geiger mode drive of the photo detector 400 may be easily realized through the setting of the capacitance control circuit 440.

The photo detector 400 of FIG. 5 has a method through which the optimized Geiger mode drive voltage may be provided by controlling a capacitance of a coupling capacitance. However, the present invention is not limited thereto. That is, the photo detector may have a method through which an overdrive voltage Vod is provided to an anode of the APD. However, at this point, the APD is driven in the Geiger mode at a low interval (or, a falling edge) of a pulse of an overdrive voltage Vod.

Figure 8A:
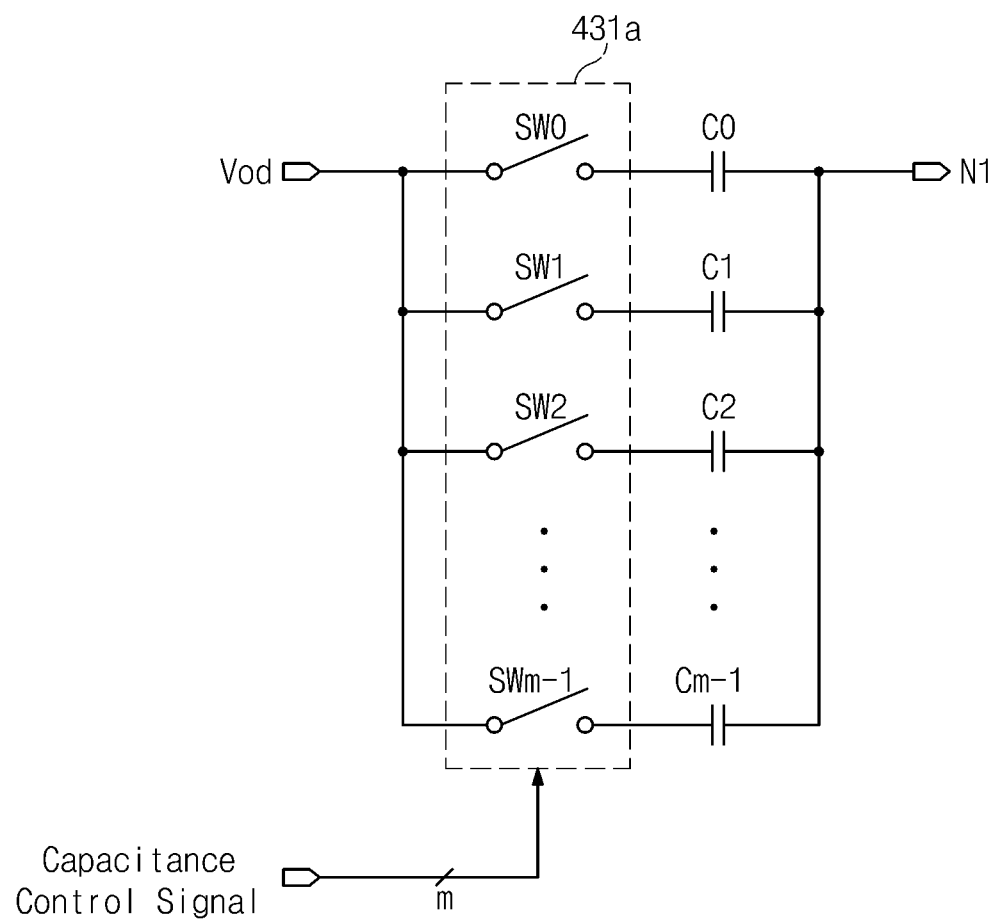
FIGS. 8A and 8B are circuit diagrams illustrating examples of the capacitance variable type coupling capacitor of FIG. 7.
Figure 8B:
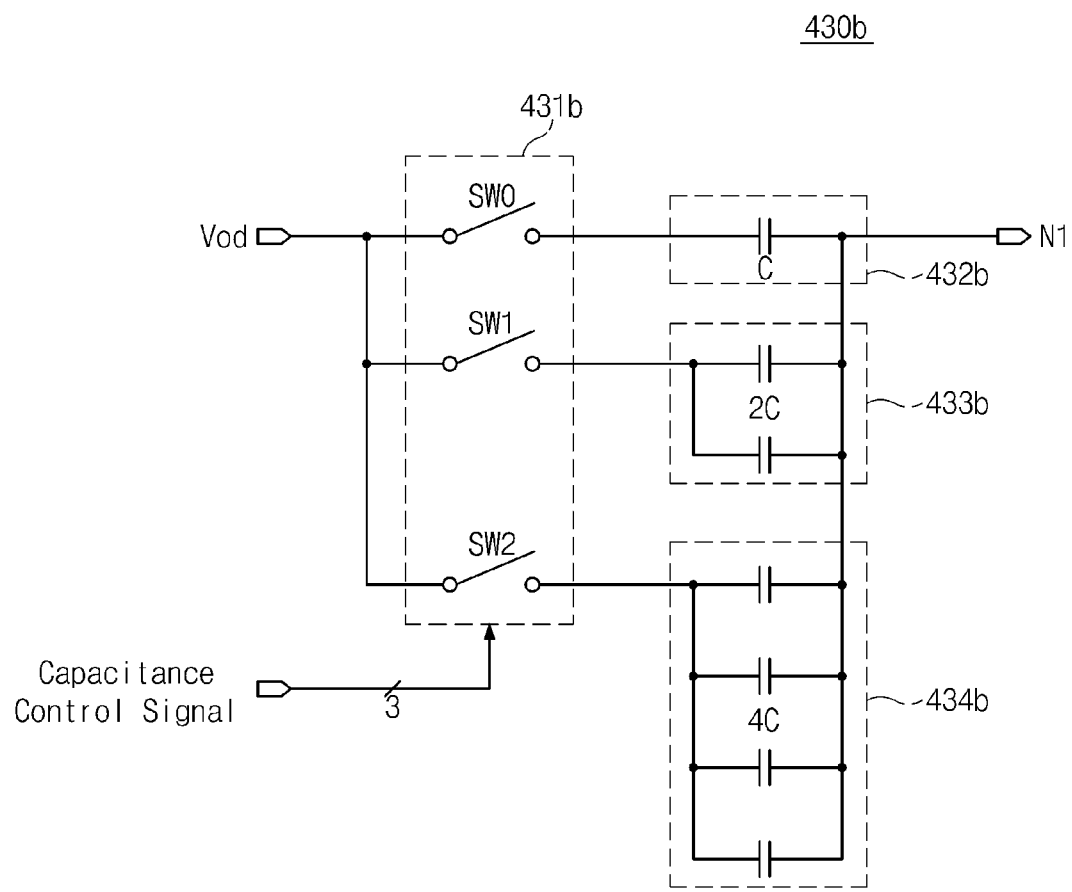

FIGS. 8A and 8B are circuit diagrams illustrating examples of the capacitance variable type coupling capacitor 430 of FIG. 7. FIG. 8A illustrates examples of switching each of integrated coupling capacitors C0, C1, . . . , Cm-1 having various capacitances. Additionally, FIG. 8B illustrates a capacitance variable type coupling capacitance that is discreetly set by a capacitance control signal provided in a digital format.

Referring to FIG. 8A, a capacitance control of a coupling capacitor 430a is realized by a combination of a switch terminal 431a. A switch terminal 431a connected to each input terminal of an overdrive voltage Vod and each of the coupling capacitors C0, C1, . . . , Cm-1 may include a plurality of switches SW0, SW1, . . . , SWm-1. Each of the switches SW0, SW1, . . . , SWm-1 is turned on or off in response to a capacitance control signal. Then, a total capacitance of the coupling capacitor 430a is a combined capacitance of the turn-on switches. Moreover, a pulse of an overdrive voltage Vod having a fixed level is provided to switch into the Geiger mode. Then, a cathode voltage $V_{N1}$ of the APD rises by a coupling voltage corresponding to the combined capacitance.

Referring to FIG. 8B, a capacitance control of the coupling capacitor 430b is realized by a combination of the switch terminal 431b. The switch terminal 431b connected to each input terminal of an overdrive voltage Vod and each of the coupling capacitor 432b, 433b, and 434b includes a plurality of switches SW0, SW1, and SW2. Each of the switches SW0, SW1, and SW2 is turned on or off in response to a capacitance control signal. Then, a total capacitance of the coupling capacitor 430b is a combined capacitance of the turn-on switches. Moreover, a pulse of an overdrive voltage Vod having a fixed level is provided to switch into the Geiger mode. Then, a cathode voltage $V_{N1}$ of the APD rises by a coupling voltage corresponding to a combined capacitance.

The coupling capacitor 430b of FIG. 8B provides a capacitance control signal as a 3-bit binary signal, such that controlling is made by a combined capacitance of a discreet size. Additionally, a unit capacitance C constituting each of the coupling capacitors 432b, 433b, and 434b may be formed with the same size such that its integrations may be easily achieved.

Figure 9:
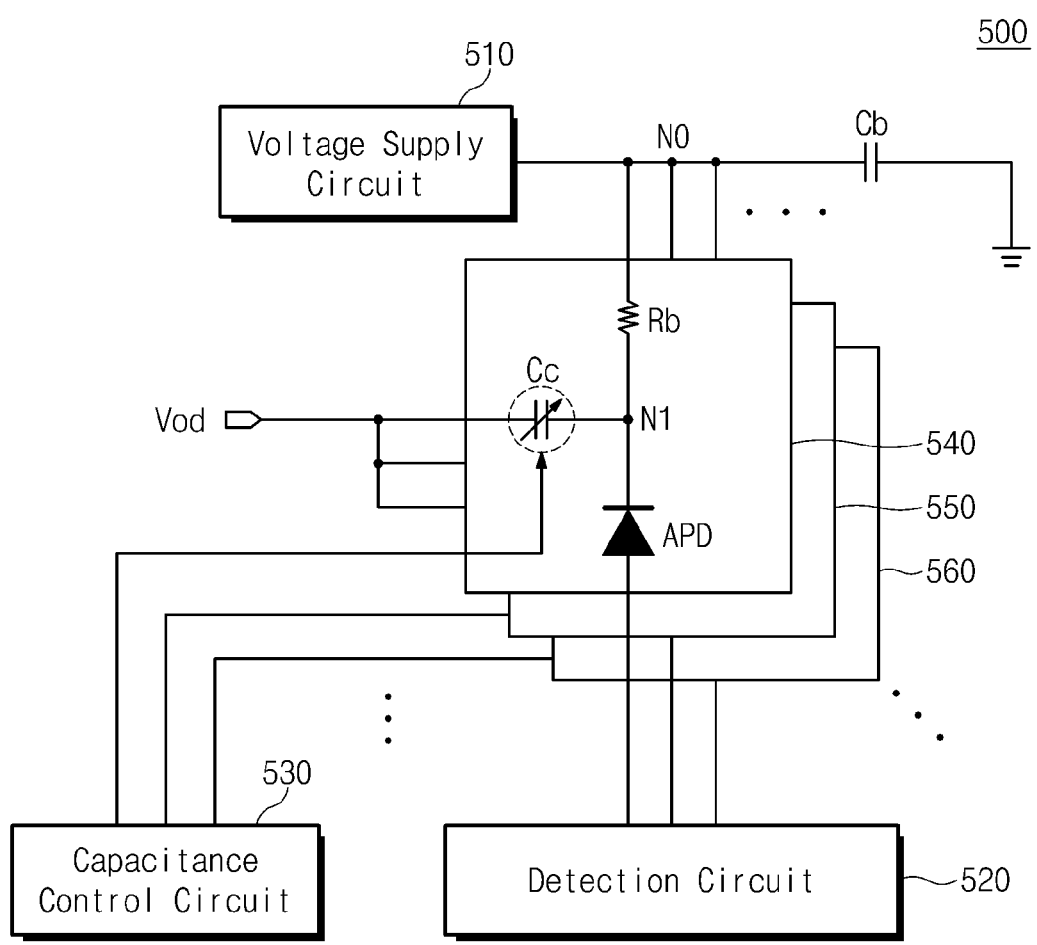
FIG. 9 is a block diagram illustrating an array of a photo detector according to another embodiment of the present invention.

FIG. 9 is a block diagram illustrating an array of a photo detector according to another embodiment of the present invention. Referring to FIG. 9, the photo detector 500 includes photo detection cells 540, 550, and 560, each having an APD, a bias resistor Rb, and a coupling capacitor Cc. The photo detector 500 includes a voltage supply circuit 510 and a bias capacitor Cb. The photo detector 500 includes a detection circuit 520 for detecting a photoelectric current generated by each of the photo detection cells 540, 550, and 560.

The voltage supply circuit 510 generates a high voltage to provide it to each of the photo detection cells 540, 550, and 560. The generated high voltage generated by the voltage supply circuit 510 is provided to the APDs of each of the photo detection cells 540, 550, and 560 through the respective bias resistors Rb. Then, the bias capacitor Cb serves to stably provide a voltage that the voltage supply circuit 510 provides to the APDs. Here, the voltage supply circuit 510, the bias capacitor Cb, and the bias resistor Rb may constitute a bias circuit.

The detection circuit 520 detects a photoelectric current that each of the photo detection cells 540, 550, and 560. Each of the photo detection cells 540, 550, and 560 may be driven in the Geiger mode when an overdrive voltage Vod is provided. The detection circuit 520 determines whether there are photons or not using a photoelectric current that each of the photo detection cells 540, 550, and 560 detects in the Geiger mode.

Each of the photo detection cells 540, 550, and 560 includes an APD, a bias resistor Rb, and a coupling capacitor Cc. An overdrive voltage Vod for boosting a cathode voltage $V_{N1}$ of the APD may be provided to a coupling capacitor Cc of each of the photo detection cells 540, 550, and 560. The overdrive voltage Vod having the same size may be provided to the photo detection cells 540, 550, and 560. However, an integrated capacitance variable type coupling capacitor Cc may have the photo detection cells 540, 550, and 560 of different sizes. Accordingly, each of the photo detection cells 540, 550, and 560 may receive respectively different coupling voltages. As a result, even if the APD of each of the photo detection cells 540, 550, and 560 has a different characteristic, the optimized Geiger mode drive voltage may be provided.

The capacitance control circuit 530 has a configuration for setting a capacitance of a coupling capacitor of each of the photo detection cells 540, 550, and 560. The capacitance control circuit 530 sets a capacitance of the coupling capacitor Cc to allow each of the photo detection cells 540, 550, and 560 to be optimally driven in the Geiger mode. As mentioned above, the capacitance control circuit 540 may include a fuse option for providing a capacitance control signal as a binary data or a programmable nonvolatile memory device such as an EPROM. Or, the capacitance control circuit 530 may include volatile memory devices such as a register to store and provide binary data patched from a nonvolatile memory device.

Figure 10:
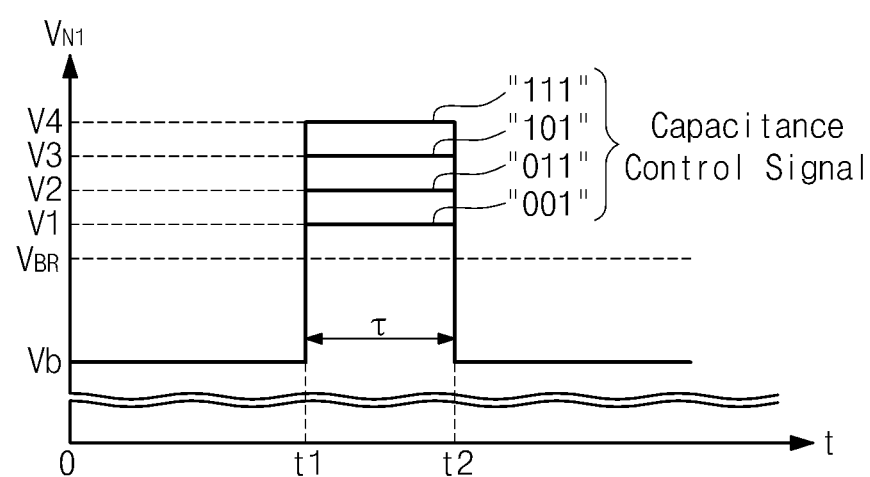
FIG. 10 is a timing diagram illustrating a bias operation of the photo detector of FIG. 9.

FIG. 10 is a timing diagram illustrating a bias operation of the photo detector 500 of FIG. 9. Referring to FIG. 10, it illustrates changes of a cathode voltage $V_{N1}$ of the APD in each of the photo detection cells 540, 550, and 560 of FIG. 9.

The capacitance control circuit 530 of FIG. 9 provides a capacitance control signal of 3 bits to allow each of the photo detection cells 540, 550, and 560 to be driven in the optimized Geiger mode condition. Moreover, in order to enter into the Geiger mode, an overdrive voltage Vod is provided. Then, a cathode voltage $V_{N1}$ of the APD in each of the photo detection cells 540, 550, and 560 is biased to a voltage of a plurality of levels at the timing t1.

For example, in a photo detection cell providing a capacitance control signal having a binary value of '011', a cathode voltage $V_{N1}$ of the APD is biased to a V2 level. Moreover, in a photo detection cell providing a capacitance control signal having a binary value of '101', a cathode voltage $V_{N1}$ of the APD is biased to a V3 level. That is, if a capacitance control signal is a binary signal of 3 bits, eight respectively different capacitances may be set. In order to improve accuracy of a control, the more number of unit capacitors C and switches SWs is required.

In the above mentioned embodiment, the detection circuits 120, 220, 320, 420, and 520 may be configured through a method of directly detecting a photoelectric current. Or, the detection circuits 120, 220, 320, 420, and 520 may be configured to detect a photoelectric current sensed by adding a resistor as a voltage signal. Moreover, the detection circuits 120, 220, 320, 420, and 520 may further include a pre-amplifier or a trans impedance amplifier to improve detection performance.

Furthermore, the APD in each of the embodiments may be formed through a process using a compound or silicon or other various materials. That is, advantages of the present invention may be applied to typical integrated APDs driven in the Geiger mode.

The photo detector according to embodiments of the present invention may be easily applied to a three-dimensional image system. In order to visualize an image of an object in real-time, a single laser pulse may be used to obtain an entire three-dimensional image of an object. The key technology of a three-dimensional imaging is that returning light after a laser pulse is projected on an entire region of an object is received through an array of photo detection cells. Moreover, a three-dimensional image may be obtained by calculating time of flight (TOF) of a laser pulse by each pixel.

When the photo detector according to embodiments of the present invention is used for a three-dimensional LIDAR system, reflected and returning weak photons may be easily detected at a long distance.

According to embodiments of the present invention, a photo detector including an avalanche photodiode may be easily configured with an integrated circuit.

Moreover, deviation of operating characteristics in each detector may be easily adjusted by driving each avalanche photodiode with respectively different bias voltages through a coupling capacitor.

Furthermore, a coupling capacitor may quench an avalanche photodiode using a low voltage. This may drastically reduce an after pulsing phenomenon, such that other operating characteristics may be improved.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A photo detector comprising:
an avalanche photodiode;
a bias circuit supplying a bias voltage to one end of the avalanche photodiode;
a detection circuit connected to another end of the avalanche photodiode and detecting a photoelectric current occurring in the avalanche photodiode;
a coupling capacitor connected to the one end of the avalanche photodiode and supplying a coupling voltage to drive the avalanche photodiode in a Geiger mode; and
a capacitance control circuit to set a capacitance of the coupling capacitor.

2. The photo detector of claim 1, wherein the bias voltage is lower than a breakdown voltage of the avalanche photodiode.

3. The photo detector of claim 1, wherein the coupling capacitor has a fixed type and a size of the coupling voltage varies according to a size of an overdrive voltage provided to the coupling capacitor.

4. The photo detector of claim 1, wherein the coupling capacitor has a variable type and a size of the coupling voltage varies according to a capacitance of the coupling capacitor.

5. The photo detector of claim 1, wherein the capacitance control circuit comprises a programmable memory device.

6. The photo detector of claim 1, wherein the bias circuit comprises:
a voltage supply circuit generating a high voltage;
a bias capacitor connected between an output node of the voltage supply circuit and a ground and stabilizing the high voltage; and
a resistor connected to the output node of the voltage supply circuit and the one end of the avalanche photodiode.

7. The photo detector of claim 1, wherein when the coupling capacitor is connected to the one end of the avalanche photodiode, the photo detector is driven in the Geiger mode at a high level interval of the coupling voltage.

8. The photo detector of claim 1, wherein a differential voltage is supplied to the coupling capacitor.

9. The photo detector of claim 1, wherein the avalanche photodiode or the coupling capacitor is fabricated into an integrated circuit.

10. A photo detector comprising:
a plurality of photo detection cells, each having an avalanche photodiode and a coupling capacitor supplying a coupling voltage to an end of the avalanche photodiode;
a bias circuit supplying a bias voltage to an end of each of the plurality of photo detection cells; and
a detection circuit connected to another end of the avalanche photodiode of each of the plurality of photo detection cells and detecting a photoelectric current detected from the plurality of photo detection cells during a Geiger mode;
wherein a coupling capacitor of each of the plurality of photo detection cells has a fixed type and at least two coupling voltages of respectively different levels are supplied to the coupling capacitors during the Geiger mode.

11. The photo detector of claim 10, wherein a coupling capacitor of each of the plurality of photo detection cells has a variable type and a capacitance of each coupling capacitor of the plurality of photo detection cells is set with one of at least two respectively different sizes.

12. The photo detector of claim 11, wherein an overdrive voltage of the same level to induce a coupling voltage is supplied to each coupling capacitor of the plurality of photo detection cells.

13. The photo detector of claim 12, further comprising a capacitance control circuit to set a capacitance of each coupling capacitor of the plurality of photo detection cells.

14. The photo detector of claim 10, wherein the avalanche photodiode or the coupling capacitor in each of the plurality of photo detection cells is integrally formed and the plurality of photo detection cells are arranged in an array of a two-dimensional plane.

15. A photo detector comprising:
an avalanche photodiode;
a bias circuit supplying a bias voltage to one end of the avalanche photodiode;

a detection circuit connected to another end of the avalanche photodiode and detecting a photoelectric current occurring in the avalanche photodiode;

a coupling capacitor connected to the other end of the avalanche photodiode and supplying a coupling voltage to drive the avalanche photodiode in a Geiger mode; and a capacitance control circuit to set a capacitance of the coupling capacitor.

16. The photo detector of claim 15, wherein when the coupling capacitor is connected to the other end of the avalanche photodiode, the photo detector is driven in the Geiger mode at a low level interval of the coupling voltage.

* * * * *